April 7, 1970 T. S. SHEVLIN 3,505,498
COOKING UTENSIL WITH INTEGRAL DIELECTRIC LAYER AND
ELECTRICAL HEATING ELEMENT
Filed July 23, 1968

INVENTOR.
THOMAS S. SHEVLIN
BY Kinney, Alexander,
Sell, Steldt & DeLaHunt
ATTORNEYS

United States Patent Office

3,505,498
Patented Apr. 7, 1970

3,505,498
COOKING UTENSIL WITH INTEGRAL DIELECTRIC LAYER AND ELECTRICAL HEATING ELEMENT
Thomas S. Shevlin, White Bear Lake, Minn., assignor to Minnesota Mining and Manufacturing Company, St. Paul, Minn., a corporation of Delaware
Filed July 23, 1968, Ser. No. 746,987
Int. Cl. F27d *11/00;* H05b *3/16*
U.S. Cl. 219—385      3 Claims

ABSTRACT OF THE DISCLOSURE

Thin metallic cooking utensils having a low heat capacity and heated by an integral electrical heating element. The element is insulated from the metallic utensil by a vitreous porcelain dielectric layer of lead borosilicate and minute quartz crystals, the crystals added to increase the viscosity of the lead borosilicate when the latter is heated for conversion to fused glass.

BACKGROUND OF THE INVENTION

Integral heating elements in the form of wire or film resistors are well known as a means for heating articles as laboratory glassware, ovens, cooking utensils, heating trays, etc. Generally when film resistors have been used in conjunction with laboratory ware and cooking utensils it has been preferable to manufacture the ware or utensils from ceramic materials such as glass, earthenware, stoneware, clay and similar materials having good dielectric properties.

For example, DeWoody et al. U.S. Patents 2,979,594, 3,050,608 and 3,092,704 disclose the use of a metallic resistance coating applied to various laboratory articles made from glass such as Pyrex, a trademark for borosilicate types of glass. Similarly DelButtero U.S. Patent 2,603,740 shows a metallic resistance coating applied to cooking utensils made of ceramic materials or a special glass having a small coefficient of expansion. The laboratory and cooking ware described in these patents are of conventional shape, design and weight.

Both DeWoody and DelButtero suggest placing the film resistor on conventional iron or other metallic utensils and laboratory ware in modified embodiments of their respective inventions. In the modifications the resistor is deposited upon a vitreous enamel insulating layer, the latter bonded directly to the metal. However, in both of these patents the preferred embodiments comprise ware of glass and ceramic materials.

One reason why glass and similar ceramics have been the preferred material for cooking utensils utilizing film resistors as a heat source is that an intermediate insulating layer such as vitreous enamel must be disposed between the resistor and the body of metallic utensils. Insulating or dielectric layers of vitreous enamel, however, have unsatisfactory dielectric properties within normal cooking temperature ranges of 375–600° F.

Heretofore vitreous enamel insulating layers have primarily comprised alkali or alkaline earth oxides which allow a high "mobility" or movement of ions at temperatures within ranges necessary for cooking and baking foods. Consequently, they are not useful at the higher ranges of temperature because there is a serious danger of electric shock when the hot utensil or its handle is connected to an electric source.

Ganci U.S. Patent 2,477,121 is an exemplary patent utilizing alkalies and alkaline earth oxides. A vitreous enamel frit of alkali group oxides comprising sodium oxide ($NaO_2$) potassium oxide ($K_2O$), lithium oxide ($Li_2O$) and alkaline earth group oxides comprising barium oxide ($BaO$), zinc oxide ($ZnO$) and calcium oxide ($CaO$) are combined and fired to form a vitreous insulating or dielectric layer for use in comparatively low temperature environments such as the conductor of a rheostat.

Garaway U.S. Patent 2,859,321 attempts to overcome the relatively poor dielectric strength of conventional vitrified enamel insulating layers by utilizing a devitrified ceramic enamel. This patent relies upon a vitrified enamel as a source of material to produce the devitrified layer. A special devitrifiable frit is utilized in this disclosure to produce the enamel. The frit contains alkali oxides which normally allow movement of ions at temperatures suitable for cooking. To attain satisfactory dielectric properties, the enamel is devitrified either by processing from the special frit or first producing the material as a vitrified enamel and then devitrifying in a second firing.

SUMMARY OF THE INVENTION

This invention relates to thin metal cooking utensils or ovens heated by means of an integral film resistor coated over a vitreous porcelain insulating layer of exceptionally high dielectric properties, the latter bonded to the utensil. The utensil utilizes thin metals such as mild steel which has a low heat capacity; therefore, most of the heat generated by the resistance layer is passed directly into the food. Since heat transfer is rapid, the cooking process can be easily controlled by varying the amount of current applied to the resistor. Additionally, the thin metal is easy to shape into any desired configuration and is light in weight, therefore easy to handle and manufacture. There is little lateral heat transfer in the thin metal utensil. This is an important advantage for the purposes of special types of cooking.

The porcelain insulating layer disposed between the utensil and film resistor comprises a vitrified porcelain containing lead borosilicate which has very good dielectric properties at high temperatures within the ranges necessary for cooking and baking. Prior art vitreous insulating porcelains have not utilized compositions similar to lead borosilicates. Compositions of this nature have a comparatively low viscosity when exposed to firing temperature necessary for vitrification. As a result compositions such as lead borosilicate tend to "run" or migrate over the metallic surface to which they are applied during firing. To attain a suitable viscosity during the fusion process without altering the dielectric properties of the lead borosilicate composition or significantly altering the coefficient of expansion of the dielectric layer, this invention contemplates the use of minute quartz crystals as an additive to a lead borosilicate frit. By adding quartz crystals or flint to the frit, the attained viscosity of the resulting composition is sufficient to resist any tendency to "run" or migrate during firing or vitrification.

DESCRIPTION OF THE DRAWINGS

Understanding of the invention will be facilitated by referring to the accompanying drawings in which like numerals refer to like parts in the two views and in which.

DETAILED DESCRIPTION

Figure 1:
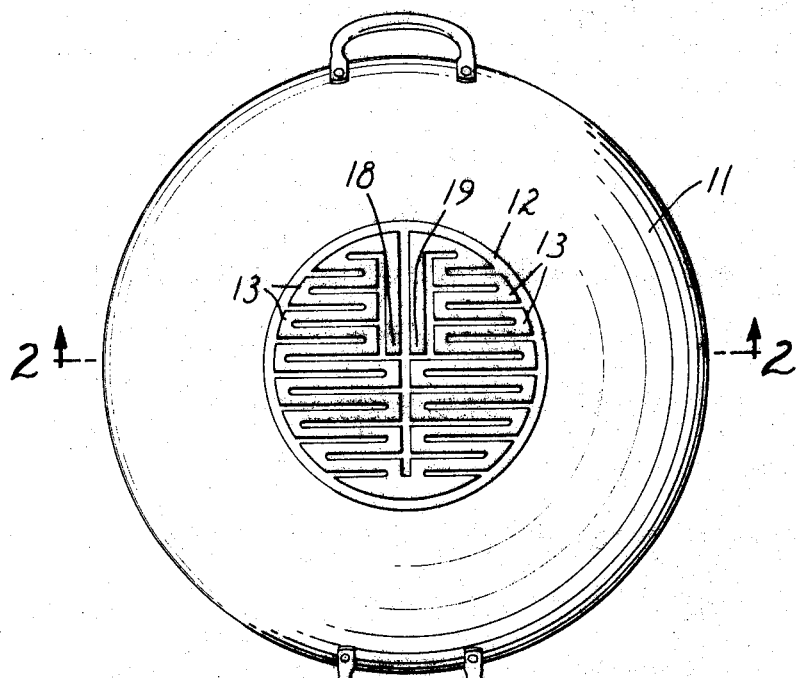
FIGURE 1 is a perspective view of the bottom surface of a cooking receptacle showing the film resistor and porcelain dielectric layer.
Figure 2:
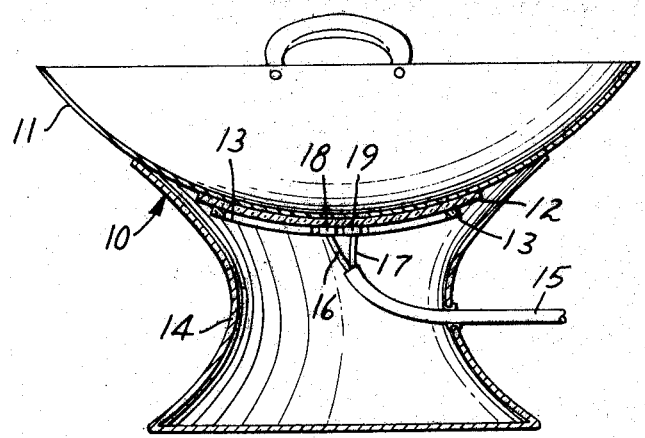
FIGURE 2 is a sectional view of the receptacle of FIGURE 1 taken along the lines and in the direction of the arrows 2—2 of FIG. 1 with the film resistor and porcelain dielectric layer enlarged and the receptacle suspended on a supporting member, the latter also shown in section.

In essence this invention relates to thin metal cooking utensils and ovens heated by electric heating elements, the element separated from the utensil by a dielectric or insulating layer. An exemplary form of utensil is shown in the drawings and is generally designated by the numeral 10 in FIGURE 2. Utensil 10 has a cooking body or receptacle 11 into which foodstuffs are placed for cooking or baking. Receptacle 11 has a vitreous porcelain dielectric or insulating layer 12 affixed or bonded to an exterior surface of the receptacle. A heating element 13 preferably comprising a film resistor type of element is coated to the exterior surface of the dielectric layer 12. If desired the heating element may be embedded in an additional insulating layer (not shown) coated over the resistor 13 after the latter has been permanently affixed to layer 12. Receptacle 11 may be supported by a base or stand 14 of desired configuration. A power supply cord 15 connected to a suitable power source transmits electrical energy to resistor 13 by means of leads 16 and 17 connected to contact points 18 and 19 integral with resistor 13. If desired a thermostat (not shown) such as a bi-metallic element may be suitably connected with the power cord to maintain the amount of electrical energy and resultant heat at desired levels.

Receptacle 11 may be made of any thin metal having a high heat loss and low heat capacity. Sixteen gauge mild steel is preferable as it may be shaped into any desired configuration and has a weight of 2.5 lbs. per square foot, and a heat capacity of .865 calorie per square inch per degree centigrade. In light steel of this nature, only a small amount of thermal energy is stored in the metal. Most of the heat passes directly into the foodstuff placed in receptacle 11. Cooking and baking time can be decreased if desired and the quantity of heat passing into the foodstuffs can be accurately regulated by controlling the current applied to resistor 13.

Inasmuch as receptacle 11 comprises a thin metal and layer 12 and resistor 13 can be bonded in conformity with various contours, receptacle 11 can be made in any desired shape and configuration. For example, it can be formed into conventional circular, rectangular or square fry pans, cooking kettles, broilers, ovens, etc. The receptacle can be shaped for preparation of exotic foods such as Chinese foods traditionally prepared in a wok, a cooking dish native to that country. The utensil exemplified in the drawings is formed in the shape of a wok which is essentially a truncated sphere or bowl. In a utensil of this nature, resistor 13 is disposed on the lower portion of the bowl to produce a high concentration of heat in the base area. Foods may be cooked or deep fat fried in intense heat in the base area over resistor 13 and allowed to simmer in the final stages of cooking along the periphery of the receptacle 11 which is not undercoated with a film resistor.

The flexibility in shaping the mild steel receptacle 11 allows the device to be formed in unlimited shapes and designs of cooking utensils. Additionally, the metal is easily fabricated, such as by a die drawing process, and its light weight makes it highly adaptable for commercial and domestic cooking purposes.

Dielectric layer 12 is essentially a vitreous porcelain composed of a lead borosilicate glass with minute quartz crystals contiguously bonded to each other and the glass.

Both lead borosilicate and quartz crystals have high dielectric properties. As a result, dielectric layer 12 does not produce "offending" or "mobile" ions when heated to normal ranges of cooking temperatures. Alkalies such as sodium, potassium, lithium, etc. which have heretofore been used for insulating vitreous enamels and which produce "mobile" ions at cooking temperature ranges are entirely eliminated.

A frit composed of lead borosilicate is difficult to contain in a defined area on a metal surface during fusion or transformation to glass as it becomes fluid and subject to "running" or un-controlled migration when exposed to firing temperatures. To correct this problem quartz crystals or particles from about 25 to 60 parts by weight are added to the frit to increase the viscosity of the glass during firing. A very high proportion of the crystals do not dissolve into the glass when the glass becomes molten and fuses during firing. The crystals remain defined and add mass or body to the glass during vitrification so that the composition will not "run" over the surface of the metal to which it is being applied. During vitrification the crystals are bonded to each other and to the lead borosilicate glass to form a vitrified porcelain.

Additionally, the coefficient of expansion of the quartz crystals is substantially the same as the coefficient for the lead borosilicate glass and therefore additional additives to adjust the coefficient of expansion of the crystals to that of the glass are unnecessary.

The vitreous porcelain layer 12 comprised of a lead borosilicate glass and minute quartz crystals has very good physical and dielectric properties at temperature ranges of 350–550° F. The porcelain will not break down or fracture at this temperature. There is no significant current leakage from resistor 13 through layer 12 to the surface of receptacle 11. For example, by grounding the surface of receptacle 11 when heated to a temperature of 550° F. and applying 120 volts to resistor 13 no current leakage to ground was found. By mathematical computations this indicates a dielectric layer resistivity for layer 12 exceeding $10^9$ ohm centimeters. For practical purposes there is thus no current leakage through layer 12 to receptacle 11 rendering utensils coated with the dielectric layer entirely safe for use.

Dielectric layer 12 is prepared in the same manner as conventional vitreous enamels. A commercial lead bearing glaze frit identified as Pb–IN84 and produced by the Pemco Division of Glidden Company of Baltimore, Md. was found to be satisfactory. The Pemco frit contains the following percentages:

| | Percent |
|---|---|
| PbO | 83.0 |
| $B_2O_3$ | 10.0 |
| $SiO_2$ | 7.0 |

The composition is available in minute powder like particles in a size range below 50 microns. A quantity of 200 mesh size ground quartz crystals or flint preferably in an amount by weight equivalent to that of frit is added to produce the desired viscosity upon conversion of the frit to molten glass. The mixture of frit and quartz crystals is thus preferably by weight 50% frit and 50% crystals. However a mixture in the range by weight of 25–60% of quartz crystals and 40–75% lead borosilicate was found to produce an insulating layer with acceptable dielectric properties. An amount of clay equal to 3% of the combined weight of the frit and crystals is added to the mixture along with an amount of electrolytes or salts equal to 1% of the combined weight of the frit and crystals. Sufficient water is added to produce an aqueous mixture having a specific gravity of approximately 1.8.

In applying the dielectric layer 12, the undersurface of receptacle 11 is suitably etched or pickled and a satisfactory ground coating for bonding or affixing the dielectric layer is sprayed over the prepare surface. The aqueous mixture of lead borosilicate and quartz crystals is then sprayed in the desired area and configuration onto the ground coating in a thickness range of 6–10 mils and allowed to dry. After drying the applied mixture is fired at 1450° F. under normal atmospheric pressure for approximately 3 minutes and allowed to cool at room temperature. During firing the quartz crystals add sufficient viscosity to the molten lead borosilicate glass so that it remains confined to the area of application.

The lead borosilicate frit per se has a coefficient of expansion of approximately $11.1 \times 10^{-6}$ (° C.$^{-1}$) and the quartz crystals a coefficient of approximately $12 \times 10^{-6}$ (° C.$^{-1}$) both slightly higher than the coefficient of expansion for mild steel which is $10 \times 10^{-6}$ (° C.$^{-1}$). During firing and vitrification a small percentage of quartz crystals will dissolve in the glass thus lowering the coefficient of expansion of the resulting porcelain dielectric layer 12 to $9.3 \times 10^{-6}$ (° C.$^{-1}$). The coefficient of expansion of the steel receptacle 11 therefore is slightly greater than that of the dielectric layer. The greater coefficient of expansion of the steel receptacle places a slight compression stress on layer 12 as the receptacle contracts during cooling from the firing temperature. The compression stress augments the bond to the steel thus producing a highly satisfactory "fit" between layer 12 and receptacle 11.

After dielectric layer 12 has been affixed to receptacle 11, resistor film 13 is coated, bonded, or otherwise adhered to the dielectric layer by suitable conventional techniques. Film 13 is preferably a thick film resistor with a coefficient of expansion suitably matched with dielectric layer 12 and receptacle 11. Various thick film resistor compositions known to the art may be applied to the surface of layer 12 by spraying, painting or by silk screen techniques. Application may be in any desired configuration or size depending upon the areas of heat concentration intended for the particular utensil or oven. Film resistor 13 may have sufficient capacity to carry a 110–120 voltage of current or the resistor's capacity may be adjusted down for compatability with a power supply yielding a lower voltage output. Conversely, resistor 13 can be designed to carry higher voltages such as current from a power supply of 220 volts.

What is claimed:

1. A cooking utensil comprising: a metallic receptacle having a heat capacity of less than 1 calorie, per square inch per degree centigrade; a vitreous porcelain dielectric layer of substantially uniform thickness affixed to the surface of said receptacle in a defined area, the layer composed of lead borosilicate glass and minute quartz crystals made from the compositional mixture by weight in the range of 40–75% lead borosilicate glass and 25–60% 200 mesh ground quartz crystals, the crystals bonded to the glass and to each other, the layer having a resistivity of not less than $10^9$ ohm centimeters at a temperature of 500° F. with an applied voltage of about 120 volts; a thick film resistor affixed to the surface of said dielectric layer, for heating said receptacle; and electrical leads to apply a source of electrical energy to said resistor.

2. A cooking utensil comprising: a bowl shaped metallic receptacle; a fired vitreous porcelain dielectric layer of substantially uniform thickness bonded to a defined area at the base portion of said bowl shape receptacle, the layer composed of lead borosilicate glass and minute quartz crystals made from the compositional mixture by weight in the range of 40–75% lead borosilicate frit and 25–60% 200 mesh ground quartz crystals, the crystals precluding said frit from migrating from said defined area when the frit converts to glass at fusion temperatures of said frit; a film resistor bonded to said porcelain dielectric layer at the base portion of said receptacle; for heating the same; and electrical leads to apply a source of electrical energy to said resistor.

3. The cooking utensil of claim 2 in which the coefficient of expansion of said receptacle being substantially $10 \times 10^{-6}$ (° C.$^{-1}$) is greater than the coefficient of expansion of said dielectric layer being substantially $9.3 \times 10^{-6}$ (° C.$^{-1}$), the greater coefficient of expansion of said receptacle producing a compression stress on said dielectric layer for fiting said layer to said receptacle.

References Cited

UNITED STATES PATENTS

| 2,603,740 | 7/1952 | Del Buttero | 219—385 |
| 2,939,807 | 6/1960 | Needham | 117—212 |
| 3,092,704 | 6/1963 | De Woody et al. | 219—385 |
| 3,126,469 | 3/1964 | Feldmann et al. | 219—543 X |

FOREIGN PATENTS 413,395    4/1946    Italy.

VOLODYMYR Y. MAYEWSKY, Primary Examiner

U.S. Cl. X.R.

174—68.5; 219—432, 438, 543

UNITED STATES PATENT OFFICE
CERTIFICATE OF CORRECTION

Patent No. 3,505,498      Dated April 7, 1970

Inventor(s) THOMAS S. SHEVLIN

It is certified that error appears in the above-identified patent and that said Letters Patent are hereby corrected as shown below:

Col. 1, line 70: After "sodium oxide" insert -- ($Na_2O$), --

Col. 1, line 71: Delete "($NaO_2$)"

Col. 4, line 62: "prepare" should read -- prepared --

Col. 6, line 1, claim 1: "500°F" should read -- 550°F --

Col. 6, line 16, claim 1: After "receptacle" delete the semi-colon (;)

Col. 6, line 25, claim 3: "fiting" should read --fitting--

Signed and sealed this 1st day of September 1970.

(SEAL)
Attest:

EDWARD M. FLETCHER, JR.
Attesting Officer

WILLIAM E. SCHUYLER, JR.
Commissioner of Patents